(12) United States Patent
Woodard et al.

(10) Patent No.: US 6,451,182 B2
(45) Date of Patent: Sep. 17, 2002

(54) DUAL TITANIUM NITRIDE LAYERS FOR SOLAR CONTROL

(75) Inventors: Floyd Eugene Woodard, Belmont, CA (US); Yisheng Dai, Singapore (SG)

(73) Assignees: Southwall Technologies, Inc., Palo Alto, CA (US); Globamatrix Holdings Pte Ltd, Singapore (SG)

( * ) Notice: Subject to any disclaimer, the term of this patent is extended or adjusted under 35 U.S.C. 154(b) by 0 days.

(21) Appl. No.: 09/751,123

(22) Filed: Dec. 27, 2000

Related U.S. Application Data

(62) Division of application No. 09/184,416, filed on Nov. 2, 1998, now Pat. No. 6,188,512.

(51) Int. Cl.$^7$ .......................... C23C 14/34; B05D 5/06; B05D 1/36
(52) U.S. Cl. .............. 204/192.26; 204/192.22; 204/192.27; 427/164; 427/419.2; 427/419.7
(58) Field of Search ..................... 204/192.22, 192.23, 204/192.26, 192.27; 427/164, 419.7, 419.2

(56) References Cited

U.S. PATENT DOCUMENTS

| | | | |
|---|---|---|---|
| 5,091,244 A | 2/1992 | Bjornard | 428/216 |
| 5,216,542 A | 6/1993 | Szczyrbowski et al. | 359/588 |
| 5,513,040 A | 4/1996 | Yang | 359/585 |

*Primary Examiner*—Steven H. Ver Steeg
(74) *Attorney, Agent, or Firm*—Terry McHugh

(57) ABSTRACT

A solar control member utilizes a combination of layers that include spaced apart titanium nitride layers to selectively transmit a higher percentage of visible light than near infrared energy, with a low visible light reflection. The titanium nitride layers are spaced apart by a distance that promotes optical decoupling with respect to occurrence of constructive and destructive interference of visible light propagating between the two titanium nitride layers. In one embodiment, the titanium nitride layers are spaced apart by a laminating adhesive layer. In another embodiment, the titanium nitride layers are formed on opposite sides of a substrate. Each titanium nitride layer is sputter deposited. Care is taken to ensure that each layer does not become too metallic and to ensure that excessive oxygen is not incorporated into the layer.

18 Claims, 12 Drawing Sheets

DUAL TITANIUM NITRIDE LAYERS FOR SOLAR CONTROL

CROSS REFERENCE TO RELATED APPLICATION

This is a divisional of copending application Ser. No. 09/184,416, filed on Nov. 2, 1998, which issued on Feb. 13, 2001 as U.S. Pat. No. 6,188,512.

TECHNICAL FIELD

The invention relates generally to solar control members for coating windows and the like, and relates more specifically to applied window film members which provide solar rejection and low visible reflection.

BACKGROUND ART

Various films have been applied to windows to reduce glare and to obtain solar screening for an interior of a structure, such as a home, building or car. For example, a plastic film may be dyed to provide desired optical properties or may be coated with a number of layers to acquire the optical properties. A film that provides solar screening is one that has a low transmission in both the visible range (400 to 700 nm) and the near infrared range (700 to 2100 nm). To reduce glare, the transmission of visible light ($T_{VIS}$) must be controlled.

Primarily through absorption, dyed films can be fabricated to provide a wide range of $T_{VIS}$ values. However, dyed films generally do not block near infrared solar energy and, consequently, are not completely effective as solar control films. Another shortcoming of dyed films is that they often fade with solar exposure. When the films are colored with multiple dyes, the dyes often fade at different rates, causing unwanted color changes over the life of the film.

Other known window films are fabricated using vacuum-deposited grey metals, such as stainless steel, inconel, monel, chrome or nichrome alloys. The deposited grey metal films offer about the same degrees of transmission in the visible and near infrared portions of the solar spectrum. As a result, the grey metal films are an improvement over dyed films with regard to solar control. The grey metal films are relatively stable when exposed to light, oxygen and moisture, and in those cases in which the transmission of the coatings increases due to oxidation, color changes are generally not detectable. After application to clear float glass, grey metals block light transmission by approximately equal amounts of solar reflection and solar absorption.

Vacuum-deposited layers such as silver, aluminum and copper control solar radiation primarily by reflection. Because of the high reflection in the visible spectrum (i.e., high $R_{VIS}$), films having these vacuum-deposited layers are useful in only a limited number of applications. A modest degree of selectivity of transmission in the visible spectrum over transmission in the near infrared spectrum is afforded by certain reflective materials, such as copper and silver.

Traditionally, the best glare reducing coatings have been sputtered grey metals, such as stainless steel, chrome and nickel. The graph of FIG. 1 is a transmission spectrum 10 for a sputtered nichrome coating that is designed to transmit approximately 50% of the light at the center of the visible light spectrum (i.e., $T_{VIS}$=50%). The nichrome is affixed to a 3.2 mm-thick plate of float glass. As can be seen, the transmission of energy is controlled in both the visible and near infrared portions of the solar spectrum. A slight degree of wavelength selectivity is observed due to the iron oxide in the glass.

In the graph of FIG. 2, the visible reflectivities of single and double layer nichrome films of various thicknesses are shown as a function of the corresponding visible light transmissions. (Here, double nichrome films refer to a construct in which two optically isolated sputtered coatings are employed, with the films being separated from each other by a relatively thick (22 micrometers) layer, such as a laminating adhesive.) While not shown in FIG. 2, the nichrome layer thicknesses decrease from left to right. As can be seen, the $R_{VIS}$ value decreases and the $T_{VIS}$ value increases as the nichrome layers become thinner. The comparison between the single and double layer nichrome films evidences that the double layer of nichrome has a substantially reduced $R_{VIS}$ value for the same $T_{VIS}$ value. For example, at a $T_{VIS}$ value of 20%, the single nichrome coating has an $R_{VIS}$ value of 24%, while the double nichrome coating has an $R_{VIS}$ value of 13%. As the nichrome layers become thinner, the $R_{VIS}$ values of the two films converge.

The percentages of solar rejection achieved by films with single and double layers of nichrome are compared in the graph of FIG. 3. Solar rejection is defined as:

solar rejection=solar reflection+(0.73×solar absorption).

Within the art, solar rejection is often calculated using solar energy distributions as given in the ASTM E 891 method. The slightly better solar rejection noted for the low transmission single nichrome coatings relative to the twin nichrome equivalents is due to solar reflection differences.

A low visible light transmission and low visible light reflection film utilizing double layers of nichrome is disclosed in U.S. Pat. No. 5,513,040 to Yang. The patent discloses a solar control film having two or more transparent substrates, each bearing a thin, transparent and discontinuous film of metal having low $R_{VIS}$ and a degree of visible light blocking capacity. The substrates are arranged and laminated into a composite, such that the visible light blocking capacities of the metal films are effectively combined to provide a composite having low visible light transmittance, i.e., a low $T_{VIS}$. The discontinuous films of nichrome are attached using an adhesive layer.

The possibility of using metal nitride films in window-energy applications was discussed by C. Ribbing and A. Roos in an article entitled, "Transition Metal Nitride Films for Optical Applications," which was presented at SPIE's International Symposium on Optical Science, Engineering and Instrumentation, San Diego, July/August 1997. Single layers of TiN, ZrN and HfN were specifically identified. The article discusses the use of the materials in low emissivity coatings to replace noble metals, such as silver and gold. It is noted that the low emissivity coatings will not reach as high a selectivity as the current noble metal-based multi-layers, but may find use in aggressive environments, because of their excellent stability.

What is needed is a solar control member for application to a window or the like in order to achieve a high selectivity of visible transmission to near infrared transmission, with a controlled visible reflection and with age stability. What is further needed is a repeatable method of fabricating such a solar control member.

SUMMARY OF THE INVENTION

A solar control member utilizes a combination of layers that include spaced apart titanium nitride layers in order to achieve a desired combination of optical characteristics, including characteristics relating to visible transmission ($T_{VIS}$), near infrared transmission ($T_{NIR}$) and visible reflection ($R_{VIS}$). Adjacent titanium nitride layers are spaced apart by a distance that promotes optical decoupling with respect to constructive and destructive interference of visible light propagating between the two titanium nitride layers. In the preferred embodiment, each titanium nitride layer is formed on a separate substrate, such as a PET substrate, with first and second titanium nitride layers then being joined by a laminating adhesive having a thickness greater than the wavelengths associated with visible light (i.e., greater than 700 nm). It is recommended that the distance between the titanium nitride layers be at least 1000 nm, with 3000 nm being more preferred. In another embodiment, the first and second titanium nitride layers are formed on opposite sides of a substrate, such as PET, so that the substrate provides the recommended spacing between the two layers.

The thickness of each titanium nitride layer depends upon the desired optical properties. Preferably, the titanium nitride layers are sputter deposited in a manner that facilitates reproducibility, but allows an adaptation for varying the $T_{VIS}$ value within a range of 20 to 70% and more preferably within the range of 30 to 60%. The $T_{VIS}$ value is achieved while the $R_{VIS}$ value remains below 20%. Moreover, the ratio of transmission at the wavelength of 550 nm ($T_{550}$) to transmission at the wavelength of 1500 nm ($T_{1500}$) is at least 1.25. That is, the selectivity as defined by $T_{550}/T_{1500}$ exceeds 1.25.

In most applications, two sputtered titanium nitride layers are sufficient. Individual $T_{VIS}$ values for the films should be within the range of 45 to 70%, so that the dual film laminate structure has an $R_{VIS}$ close to 10%. However, to obtain a composite visible transmission of less than 40% while maintaining the individual film visible transmissions within the range of 45 to 70%, a third sputtered titanium nitride layer may be necessary. More than three sputtered layers may be required to obtain a composite visible transmission of 20%.

Greater wavelength selectivity is obtained if the titanium nitride layers are combined with transparent oxides (e.g., oxides of tin, indium, zinc, titanium, niobium, bismuth, zirconium, or hafnium) or nitrides (e.g., silicon or aluminum nitride) having a refractive index at least as great as that of the substrate material (the refractive index of PET is 1.7). The transparent oxides or nitrides can be placed on one or both sides of the titanium nitride. The thickness would range between 10 and 60 nm, depending upon color, reflectivity, or cost requirements. A transparent nitride, such as silicon nitride, is preferred over an oxide, since during the deposition process "crosstalk" between the titanium and silicon processes is less likely to introduce excessive oxygen into the titanium nitride layer.

In all practical vacuum web coaters, some incorporation of oxygen will occur, so that in practice what is deposited is actually titanium oxynitride. However, if excessive oxygen is incorporated into the titanium nitride coating, the wavelength selectivity and electrical conductivity will be lost. It is believed that the oxygen-to-nitrogen partial pressure ratio during the sputtering process should be less than 0.5. To ensure that wavelength selectivity and electrical conductivity are achieved, the stoichiometry of each titanium nitride layer must be controlled. Two of the concerns with regard to adversely affecting the titanium nitride performance are (1) ensuring that each layer does not become too metallic and (2) ensuring that excessive oxygen is not incorporated into the layers. In either case, the wavelength selectivity will be lost if the sputtering process is not properly performed. A titanium nitride layer will become too metallic if it is nitrogen depleted, as will occur if nitrogen flow during the process is inadequate. The exact nitrogen flow to achieve a suitable titanium nitride layer varies from coater to coater. However, the most preferred flow generally corresponds to minima in sheet resistance and absorption at 1500 nm. As the nitrogen flow is being adjusted, if a $T_{1500}$ value is to be maintained with an increase in nitrogen flow, the linespeed of the deposition process should be reduced. This is largely due to a decrease in the deposition rate of the titanium nitride.

Regarding excessive oxygen, the extra oxygen typically comes from background water and oxygen contaminants present in the sputtering system. The problem is enhanced if other oxygen-requiring processes (e.g., plasma pretreatments or reactive sputtering) are conducted in the vacuum chamber while the titanium nitride deposition process is being conducted. To reduce the likelihood that contamination will occur, the following steps may be taken (1) sputter as fast as possible using high powers and the minimum acceptable nitrogen flow, since excessive nitrogen "poisons" the titanium target and reduces the deposition rate; (2) minimize background contamination by controlling "crosstalk" between neighboring processes, by minimizing the water content in the substrate (for example by preheating or separate outgassing steps), by eliminating any water leaks in the vacuum chamber, and by adequately pumping down the vacuum system prior to beginning the deposition; and (3) sputter through a mask, so that the outer perimeter of the titanium nitride plasma (which deposits on a mask, rather than the substrate) acts as an "oxygen getter."

Optionally, the surface that is exposed when the solar control member is attached to a window is protected by a hardcoat layer. Hardcoat layers are known to provide resistance against abrasion. Another optional layer is a low surface energy layer on the hardcoat. The low surface energy layer acts as an antisoiling layer for resisting smudges and the like and as a lubrication layer for improving the resistance to mechanical abrasion.

BEST MODE FOR CARRYING OUT THE INVENTION

Figure 1:
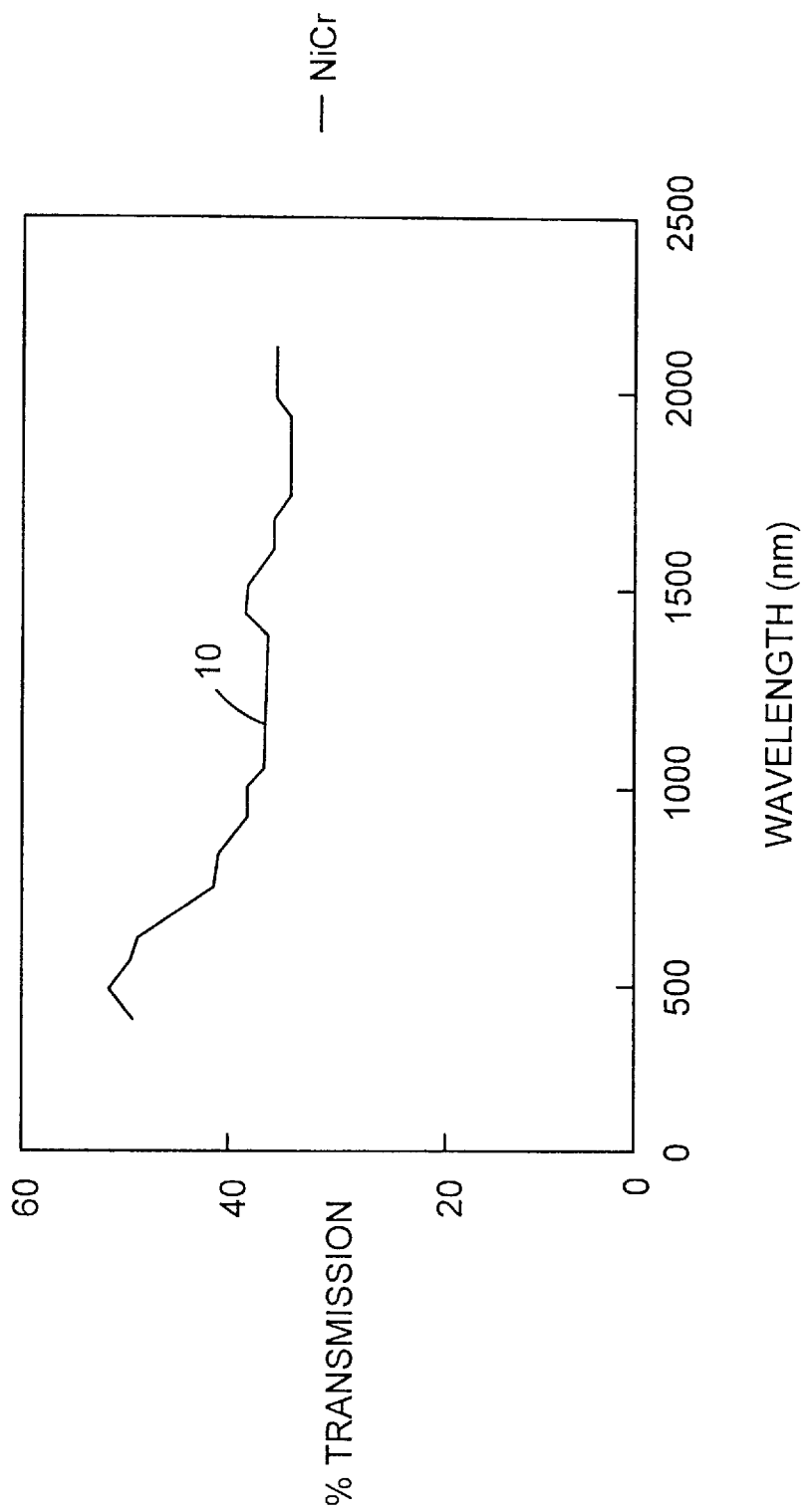
FIG. 1 is a graph of a transmission spectrum for a single layer nichrome film that is designed to transmit approximately 50% of the light at the center of the visible light spectrum.
Figure 2:
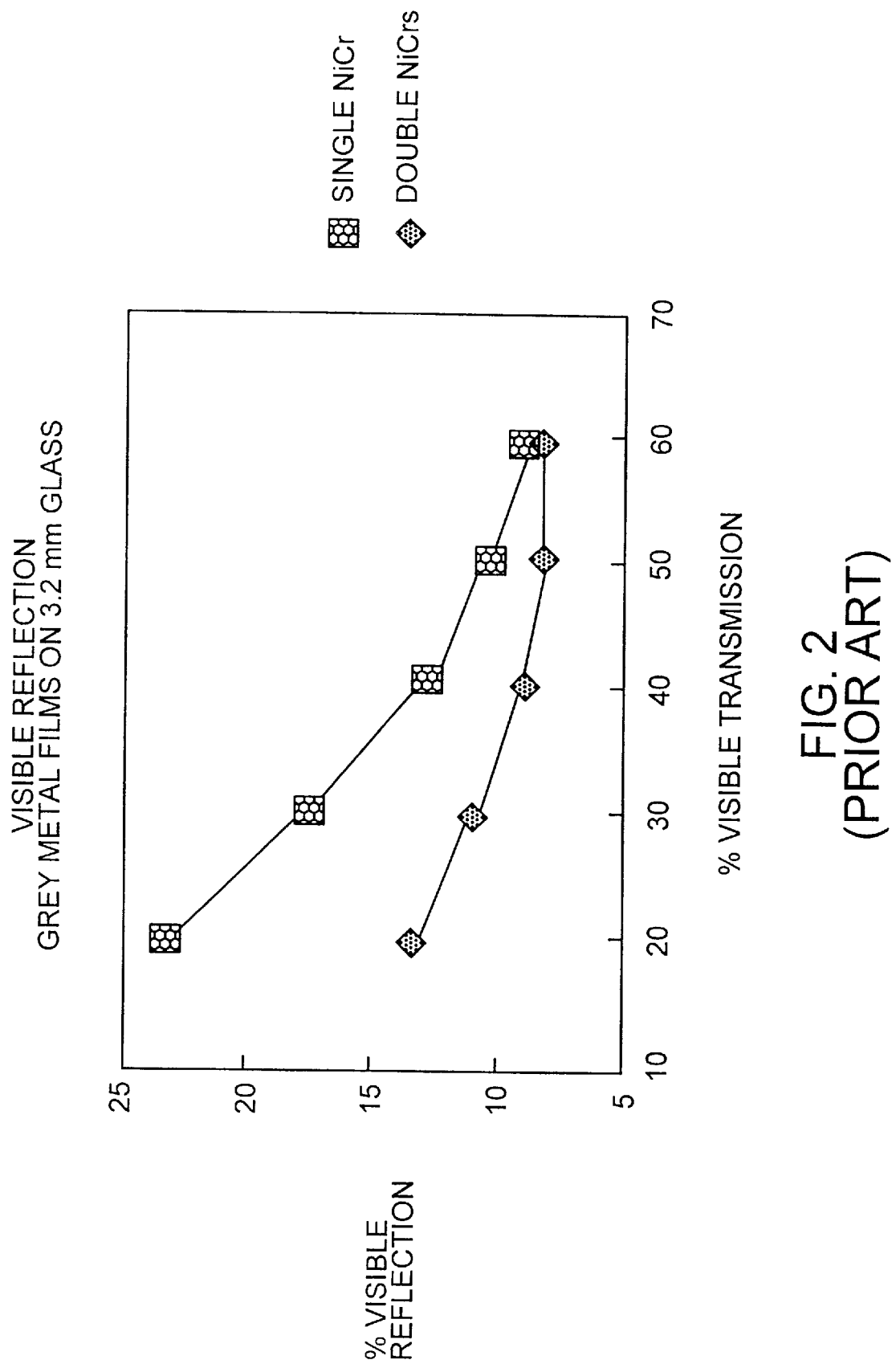
FIG. 2 is a graph of visible reflection versus visible light transmission as a function of film thickness for a single layer nichrome film and a double layer nichrome film on 3.2 mm glass.
Figure 3:
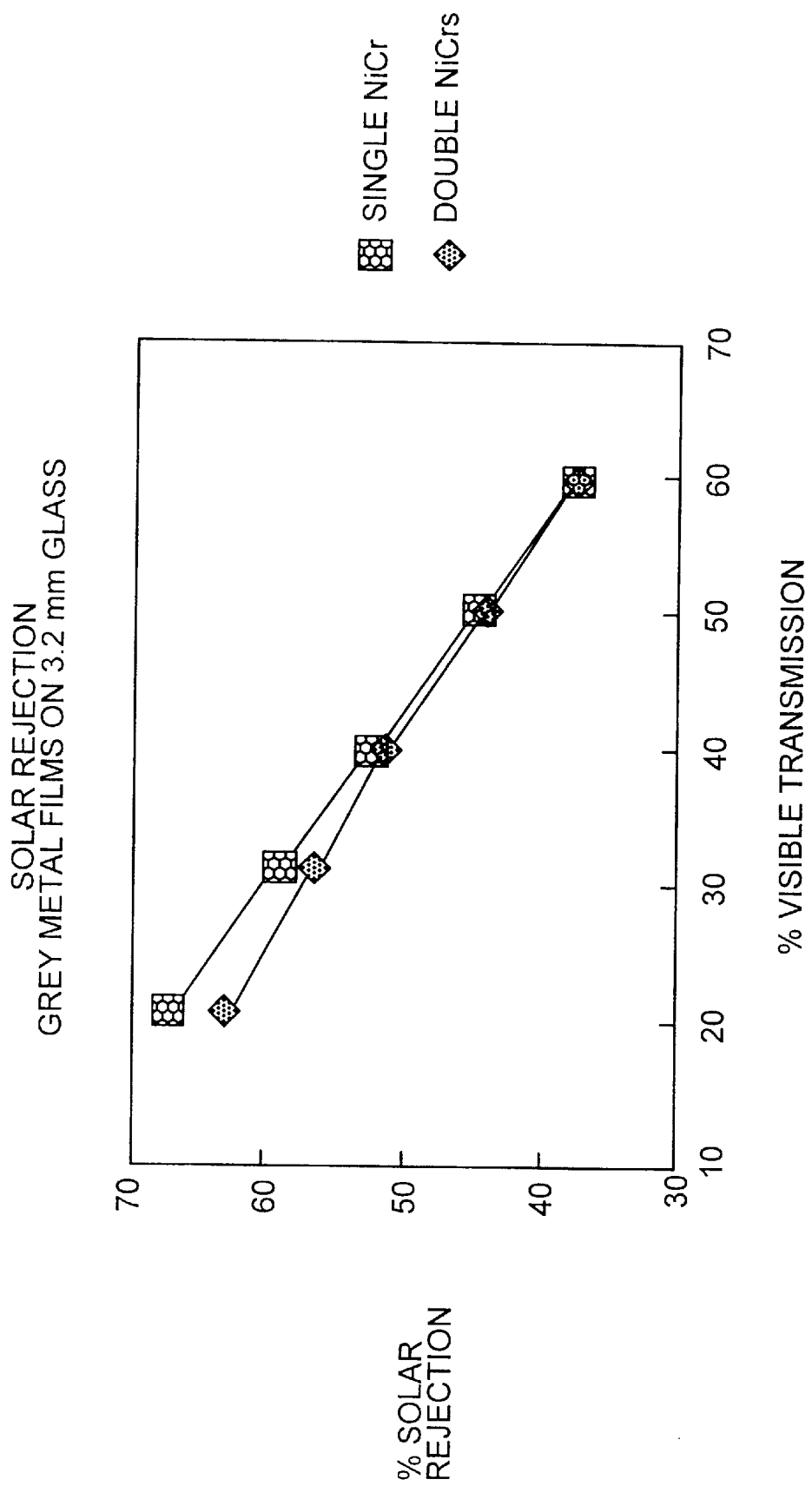
FIG. 3 is a graph of the percentage of solar rejection versus visible light transmission as a function of film thickness of a single layer nichrome film and a double layer nichrome film on 3.2 mm glass.
Figure 4:
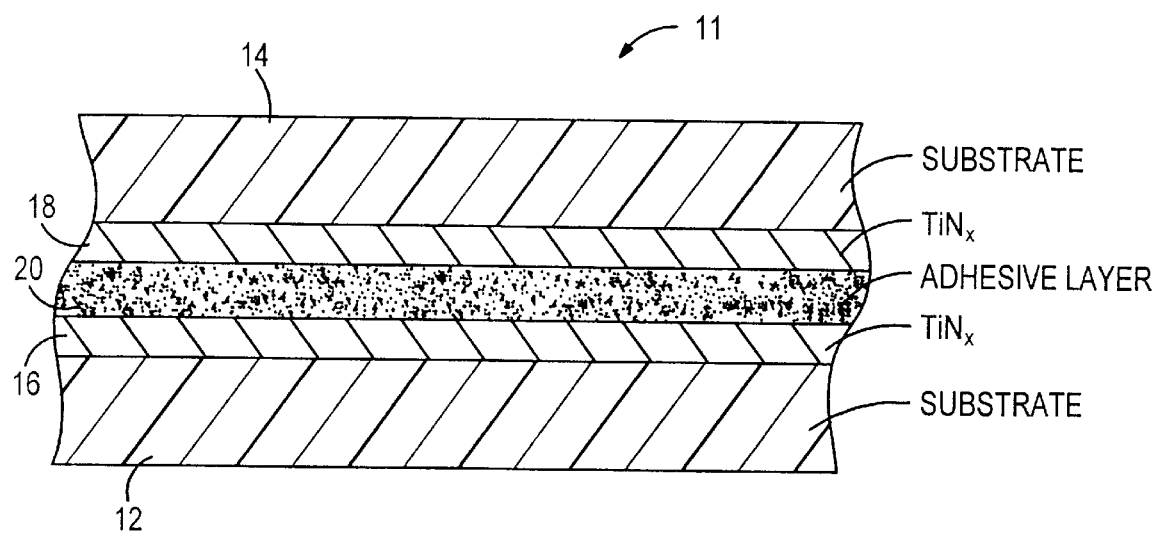
FIG. 4 is a side sectional view of a portion of a solar control member in accordance with the invention.

With reference to FIG. 4, a solar control member 11 is shown as including first and second substrates 12 and 14, with each substrate having a layer of titanium nitride 16 and 18, respectively. The titanium nitride layers are bonded together using a laminating adhesive layer 20.

Preferably, the substrates 12 and 14 are flexible members that allow the titanium nitride layers 16 and 18 to be sputter deposited using web processing techniques. The substrates may be PET films, but other materials may be substituted. The substrates must be substantially transparent, since the objectives in forming the solar control member 11 include providing an $R_{VIS}$ value in the range of 5 to 20%, a $T_{VIS}$ value in the range of 20 to 70% (and more preferably within the range of 30 to 60%), and an NIR transmission (i.e., from 700 to 2100 nm) that is lower than the $T_{VIS}$ value. With regard to the wavelength selectivity, the ratio of transmission at the wavelength of 550 nm to transmission at the wavelength of 1500 nm should be at least 1.25 (i.e., $T_{550}/T_{1500} \geq 1.25$).

A standard thickness of the substrates 12 and 14 is between 1 and 2 mils, but the thickness is not critical to the invention. The thicknesses of the titanium nitride layers 16 and 18 are selected based upon the desired optical properties of the solar control member 11. A thicker titanium nitride layer will block a greater percentage of energy, but will also increase reflection and decrease transmission within the visible range. Preferably, the individual film transmissions are within the range of 45 to 70% at the visible range. This is the preferred range of individual film transmissions, even if more than two layers of titanium nitride are used. While the layers 16 and 18 are described as titanium nitride layers, in practice it is difficult to avoid some incorporation of oxygen into the layers, so that the titanium nitride layers are actually titanium oxynitride layers ($TiN_xO_y$). However, if the amount of oxygen in the layers becomes excessive, wavelength selectivity and electrical conductivity are lost. It is believed that the ratio of oxygen to nitrogen partial pressures during the sputtering process should be less than 0.5. Measurements of various $TiN_x$ samples indicate the highest wavelength selectivity is obtained when the oxygen content of $TiN_xO_y$ coatings is less than 20 atomic percent or most preferably less than 10 atomic percent. The sheet resistance of each titanium nitride layer should be less than 500 ohms/square.

The laminating adhesive layer 20 is an optically massive layer. That is, the thickness of the adhesive layer should be such that the two titanium nitride layers 16 and 18 are sufficiently spaced apart to avoid constructive and destructive interference of visible light propagating between the two titanium nitride layers. To ensure that the spacing between the two layers is greater than the wavelengths associated with visible light, the adhesive layer should have a thickness of at least 700 nm. In a more preferred embodiment, the thickness is at least 1 micron (i.e., 1000 nm), with at least three microns being most preferred.

In another embodiment, the spacing between the two titanium nitride layers 16 and 18 is achieved by forming the two layers on opposite sides of a single substrate, such as a PET film. Thus, the laminating adhesive layer 20 would not be required. In other embodiments, the spacing between the two titanium nitride layers 16 and 18 may be provided by more than one layer. However, the layers should not adversely affect the above-identified optical objectives of the solar control member 11. While not shown in FIG. 4, there is often a hardcoat layer on one PET surface opposite to the titanium nitride coated side. Hardcoat layers improve the durability of the flexible substrate during processing and particularly during use of the end product. The hardcoat layers can be any one of a variety of known hardcoat materials, such as silica-based hardcoats, siloxane hardcoats, melamine hardcoats, and acrylic hardcoats. An acceptable thickness range is 1 μm to 20 μm. The use of hardcoat layers is not critical to the invention.

Other optional layers include primer layers between the adhesive layer 20 or the substrate layers 12 and 14 and each of the titanium layers 16 and 18. The primer layers may be used to improve adhesion between the titanium nitride layers and the adhesive or substrate. The primer layer may be a metal that undergoes oxidation or nitridation in situ during processing, so as to yield a substantially transparent, substantially colorless inorganic metal oxide. Examples of useful primer materials include silicon, titanium, chromium, nickel and alloys. The primer layer should be sufficiently thin to minimize disruption of the desired optical properties of the solar control member 11. Preferably, the primer layer has a thickness of less than 30 angstroms.

The laminating adhesive layer 20 may be an adhesive such as Morton's Adcote 1130 adhesive. This and other such adhesives are well known in the industry. For fabricating prototype samples, MacTac transfer adhesive #IP2704 may be used.

Typically, the two substrates 12 and 14 will be from separate webs, since it is more practical. However, the substrates may be different portions from a single web. That is, following the web processing operation of depositing titanium nitride onto a continuous web of PET, the PET film is divided into sections that may be combined as shown in FIG. 4. This is possible when the two titanium nitride layers 16 and 18 are to have the same thickness. However, in some applications, there may be advantages to having titanium layers of different thicknesses. In such applications, it is typically more economical to sputter the titanium nitride layers on different substrates.

Figure 5:
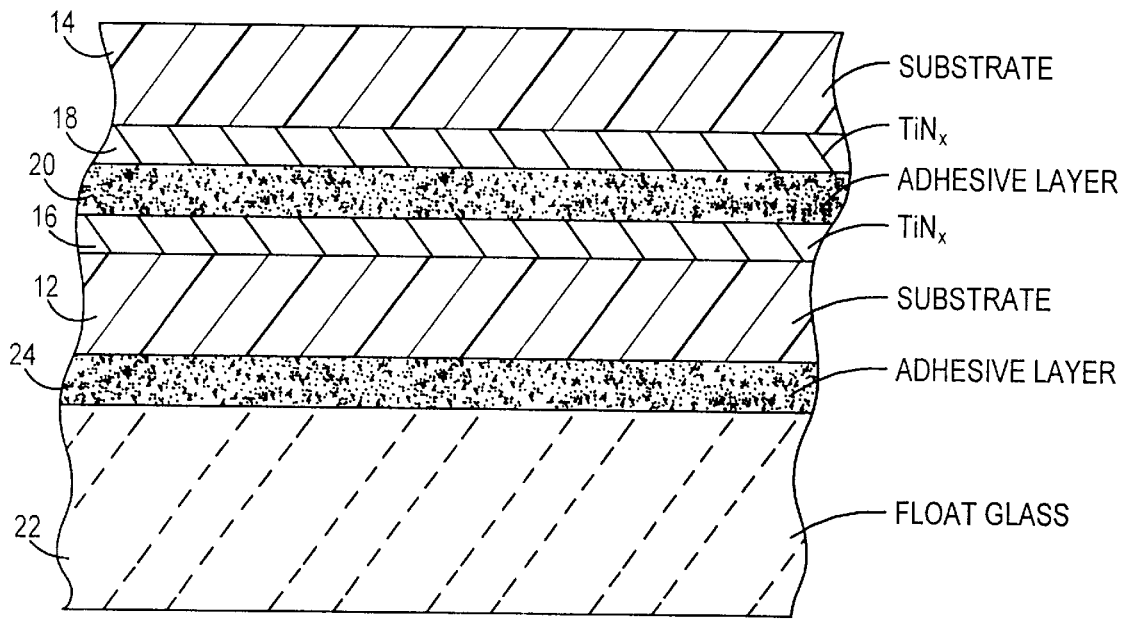
FIG. 5 is a side sectional view of the solar control member of FIG. 4 shown in a window energy application.

Referring now to FIG. 5, the solar control member of FIG. 4 is shown attached to float glass 22 by means of a second adhesive layer 24. The float glass may be a windshield of a vehicle or may be a window of a home or building. The solar control member provides solar screening to the interior of the vehicle, home or building. It should be noted that the titanium nitride layers 16 and 18 are not specifically designed to provide low heat emissivity. Although titanium nitride layers are electrically conductive, and therefore have relatively low heat emissivity and relatively high heat reflection, in the construct of FIG. 5, the titanium nitride layers do not directly contact air and are "buried" within infrared opaque wet coatings and substrates. This renders them relatively ineffective at blocking long wave (IR) heat transfer. As noted above, PET films typically are provided with a hardcoat layer. Thus, the exposed surface of the substrate 14 will be protected by the hardcoat layer. As will be explained more fully with reference to FIG. 6, another optional layer is a low surface energy (anti smudge) layer that resists mechanical damage and soiling to the solar control member.

Figure 6:
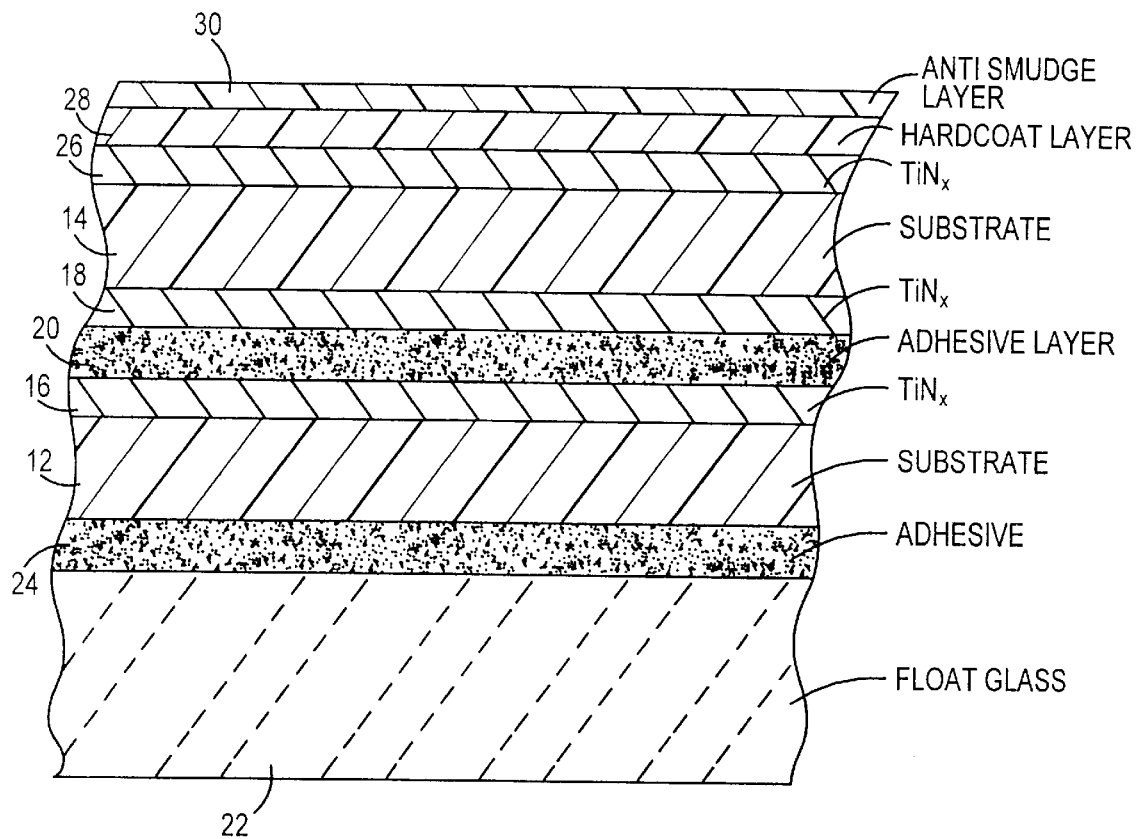
FIG. 6 is a side sectional view of another embodiment of a window energy application in accordance with the invention.

With reference to FIG. 6, a second embodiment of a solar control member is shown. For simplicity, reference numerals of FIG. 5 are used for comparable elements of FIG. 6. Thus, the solar control member is attached to float glass 22 by means of adhesive layer 24. The solar control member includes first and second titanium nitride layers 16 and 18 that were previously sputter deposited onto substrates 12 and 14 and adhered to one another by means of a laminating adhesive layer 20. The solar control member includes a third titanium nitride layer 26 on the side of the substrate 14 opposite to the second titanium nitride layer 18. While not critical, the third titanium nitride layer may have a thickness identical to the thicknesses of the first and second titanium nitride layers. As previously noted, the individual film transmission should be within the range of 45 to 70% with respect to visible light. In many applications, a third titanium nitride layer is not necessary in order to achieve the target $T_{VIS}$ value for the composite solar control member. However, if the target $T_{VIS}$ value is in the range of 20 to 40%, the third layer may be required in order to keep the $R_{VIS}$ value within the targeted range (e.g., approximately 10%). In fact, there may be applications in which more than three sputtered titanium nitride layers are necessary.

The solar control member of FIG. 6 is shown as including the hardcoat layer 28 described above. The hardcoat layer is an abrasion-resistant coating that enhances durability of the solar control member. An acceptable thickness is within the range of 1 $\mu$m to 20 $\mu$m.

An anti smudge layer 30 coats the hardcoat layer 28. The anti smudge layer reduces the susceptibility of the solar control member to scratches and other damage caused by contact with the outermost surface of the member. A desirable anti smudge layer is achieved by providing an adhesion promotion lower film of silane material and an upper film of a fluorocarbon with a low surface energy and with anti friction properties that facilitate cleaning and provide scratch resistance. The low surface energy layer may be a fluorocarbon sold by 3M Company under the federally registered trademark FLUORAD. In a more preferred embodiment, the material is FLUORAD FC722, which is sold diluted in 2% solution of a fluorinated solvent. The silane that is used as the adhesion promotion film may be N-(2-aminoethyl)-3-propyltrimethoxysilane in isopropyl alcohol (2-propanol). However, other silanes may be used, and in fact a silane may not be required in some applications.

Figure 7:
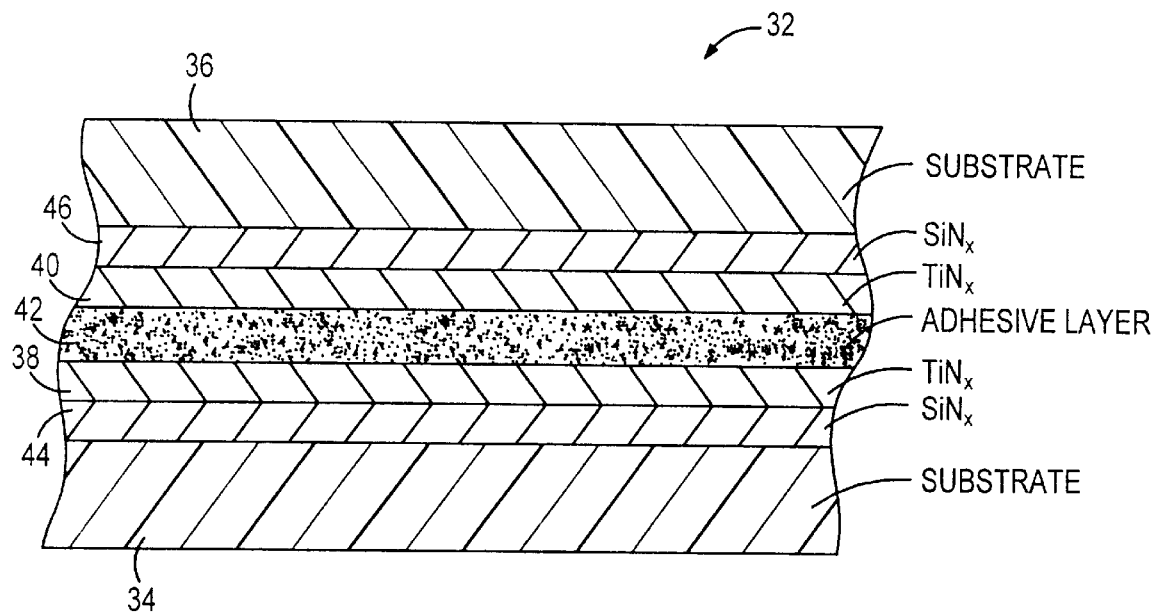
FIG. 7 is a side sectional view of a third embodiment of a solar control member in accordance with the invention.

Referring now to FIG. 7, a third embodiment of a solar control member 32 includes first and second substrates 34 and 36, first and second titanium nitride layers 38 and 40, an adhesive layer 42, and first and second silicon nitride layers 44 and 46. The only significant difference between the embodiments of FIGS. 4 and 7 is the inclusion of the silicon nitride layers 44 and 46. Greater wavelength selectivity can be obtained if the titanium nitride layers are combined with transparent oxides or nitrides with a refractive index that exceeds the refractive index of the substrates 34 and 36. Thus, if a PET film is used to form the substrates, the additional layers 44 and 46 should have a refractive index of 1.7 or greater. An acceptable transparent oxide is an oxide of tin, indium, zinc, titanium, niobium, bismuth, zirconium, or hafnium. Acceptable nitrides are silicon and aluminum nitride. However, the silicon nitride is preferred, since the nitride layers are likely to introduce excessive oxygen into the titanium nitride layers 38 and 40. While each titanium nitride layer is shown as having only one adjacent silicon nitride layer, silicon nitride may be formed on both sides of each titanium nitride layer. The thickness of the silicon nitride layers should be within the range of 10 and 60 nm, depending upon color, reflectivity, or cost requirements. While greater wavelength selectivity is achieved by including the silicon nitride layers, the solar control member 32 of FIG. 7 is less cost-effective than the member 11 of FIG. 4.

Deposition Conditions For TiN$_x$

Each of the solar control members of FIGS. 4–7 includes at least two layers of titanium nitride that cooperate to provide the desired wavelength selectivity with the low $R_{VIS}$ value. In particular, the transmission of visible wavelengths is significantly higher than the transmission of wavelengths in the near infrared. The ratio of $T_{550}$ to $T_{1500}$ should be at least 1.25. To ensure that the target selectivity is achieved, the stoichiometry of the titanium nitride must be controlled during the sputtering process. Two concerns regarding adversely affecting the titanium nitride performance are (1) ensuring that the titanium nitride does not become too metallic and (2) ensuring that excessive oxygen is not incorporated into the titanium nitride. If a titanium nitride layer becomes too metallic (i.e., nitrogen is depleted, as would happen if the nitrogen flow to the process were inadequate), wavelength selectivity will be less desirable. If excessive oxygen is incorporated into a titanium nitride layer (i.e., more than 10 to 20 percent), the selectivity will be adversely affected. Sources of extra oxygen are background water and oxygen contaminants present within the sputtering system. The difficulties are enhanced if other oxygen-requiring processes are conducted in the vacuum chamber while the titanium nitride deposition process is being conducted. For this reason, the silicon or aluminum nitride layers 44 and 46 of FIG. 7 are preferred over the formation of oxide layers.

To minimize contamination from oxygen sources, several steps can be taken. The sputtering process for depositing the titanium nitride should be performed as quickly as possible using high powers and a minimal amount of nitrogen, while still retaining the desired stoichiometry. Excessive nitrogen "poisons" the titanium target and reduces the deposition rate. A second step is to minimize background contamination. This can be accomplished by controlling "crosstalk" between neighboring processes, by minimizing the water content in the substrates (e.g., by preheating or outgassing), by ensuring that there are no water leaks in the vacuum chamber, and by adequately pumping down the vacuum system prior to the start of the deposition process. As a third step, the sputtering may occur through a mask, so that the outer perimeter of the titanium nitride plasma deposits on the mask, rather than on the substrate. Thus, the mask acts as an "oxygen getter."

A number of experiments were conducted in view of these concerns and corrective steps. Results are shown in Table 1. The legends are defined as follows:

"Linespeed"—Rate at which the film is moved through the coating zone of the system;

"N$_2$ flow"—Gas flow to the titanium source;

"R$_{SHEET}$"—Sheet resistance of TiN$_x$ coated film measured in the vacuum coater (i.e., in situ);

"T$_{1550}$"—Transmission of coated film at a wavelength of 1550 nm, measured in situ;

"T$_{max}$"—The transmission at the wavelength in the range 400 to 700 nm at which a maxima is observed;

"T$_{max}$/T$_{1550}$"—A first wavelength selectivity ratio;

"R$_{1550}$"—The reflectivity at 1550 nm;

"T$_{VIS}$"—The integrated visible transmission weighted for wavelength variations in illuminant (i.e., C) intensity and eye sensitivity (assuming a standard 2° observer);

"T$_{VIS}$/T$_{1550}$"—A second wavelength selectivity ratio.

TABLE 1

OPTIMIZATION OF THE TiN$_x$ PROCESS
OPTICAL PARAMETERS ARE FOR FILMS ONLY

| Experiment | No. 1 | No. 2 | No. 3 | No. 4 | No. 5 | No. 6 | Units |
|---|---|---|---|---|---|---|---|
| Linespeed | 7.90 | 10.15 | 13.27 | 15.76 | 18.05 | 20.0 | mm/s |
| N$_2$ Flow | 45.0 | 40.0 | 35.0 | 32.5 | 30.0 | 27.5 | sccm |
| R$_{SHEET}$ | 103 | 86 | 75 | 75 | 80 | 115 | Ω/□ |
| T$_{1550}$ | 15.3 | 14.9 | 14.8 | 15.1 | 15.0 | 14.9 | % at 1550 nm |
| T$_{max}$ | 38.9 | 40.4 | 42.4 | 43.4 | 42.5 | — | % |
| T$_{max}$/T$_{1550}$ | 2.54 | 2.71 | 2.86 | 2.87 | 2.83 | — | — |
| R$_{1550}$ | 50.6 | 52.4 | 53.6 | 53.7 | 53.3 | 49.6 | % |
| T$_{VIS}$ | 37.6 | 38.5 | 39.4 | 39.5 | 37.4 | 26.7 | % |
| T$_{VIS}$/T$_{1550}$ | 2.46 | 2.58 | 2.66 | 2.62 | 2.49 | 1.79 | — |

In these experiments, the titanium power was maintained at 5.7 kW and an argon flow was set at 110 sccms, as required to obtain a 3 milliTorr pressure. As the nitrogen flow was varied between 27.5 and 45 sccms, the linespeed was adjusted as required to maintain a T$_{1550}$ value of approximately 15%. The dimensions of the titanium target were 397.88 mm by 82.55 mm. As can be seen in Table 1, as the nitrogen flow varied, so did the spectral properties of the titanium nitride layers that were formed during the experiments.

Figure 8:
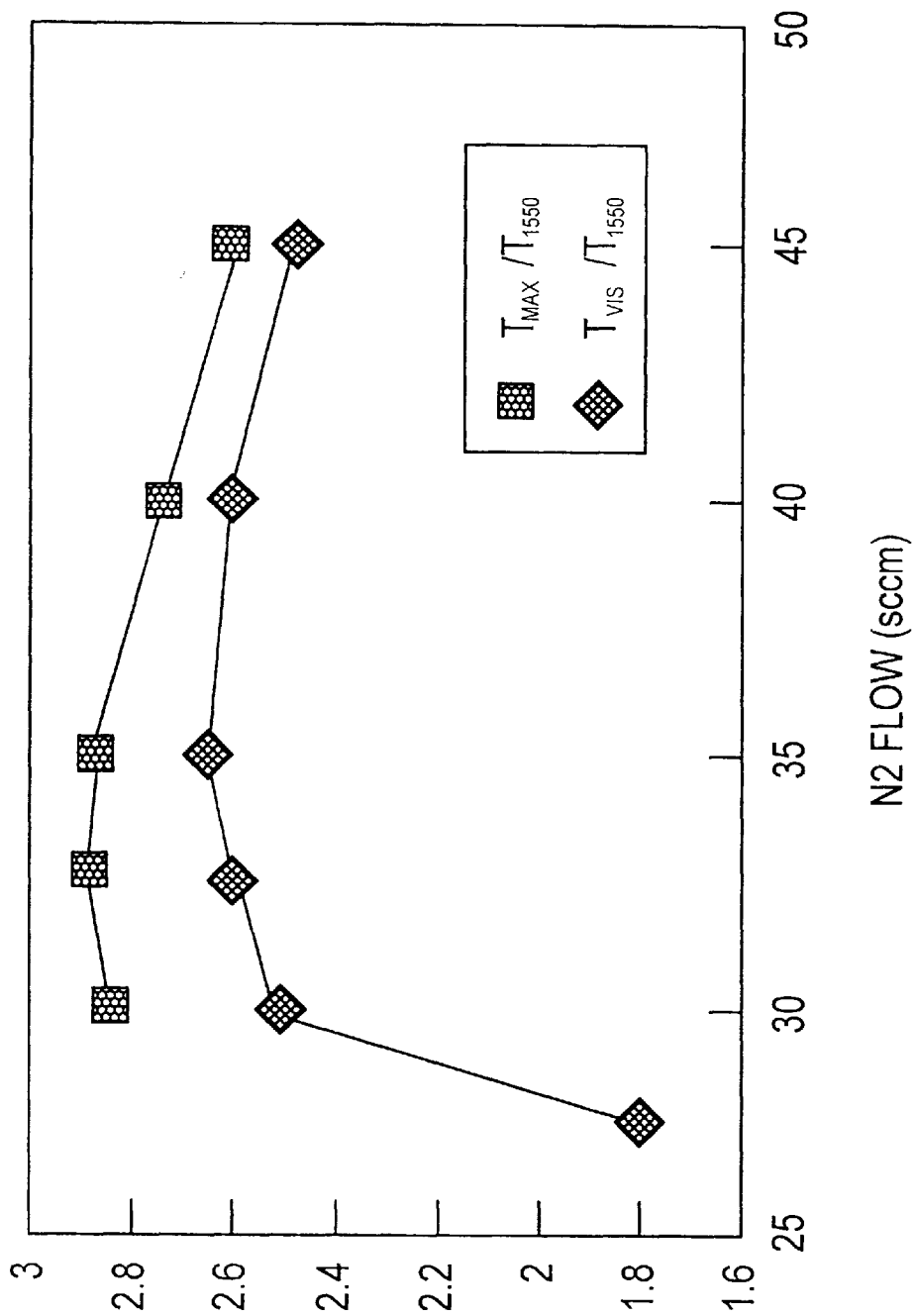
FIGS. 8–11 are plots of values from Table 1 that is to follow.
Figure 9:
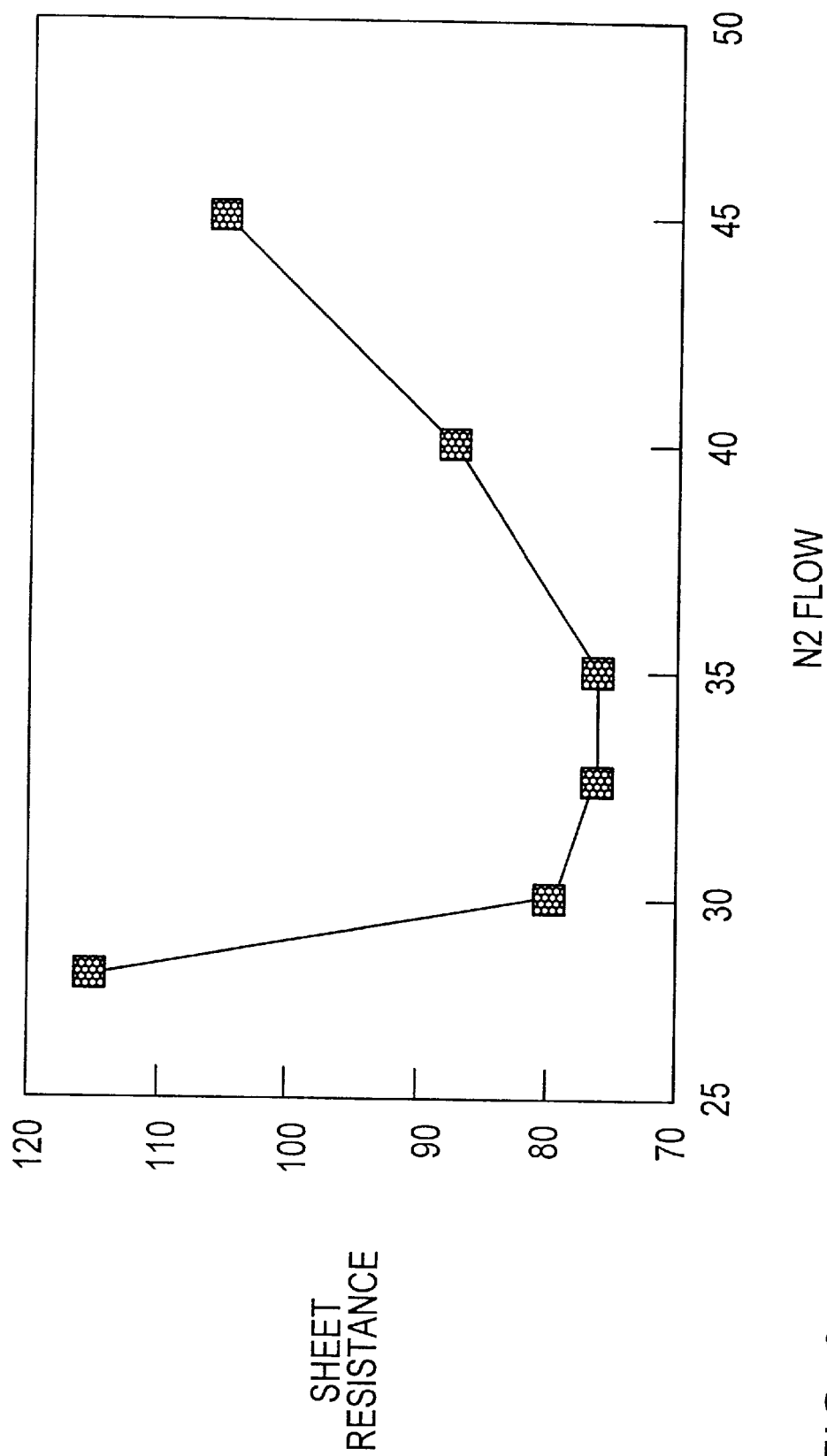
Figure 10:
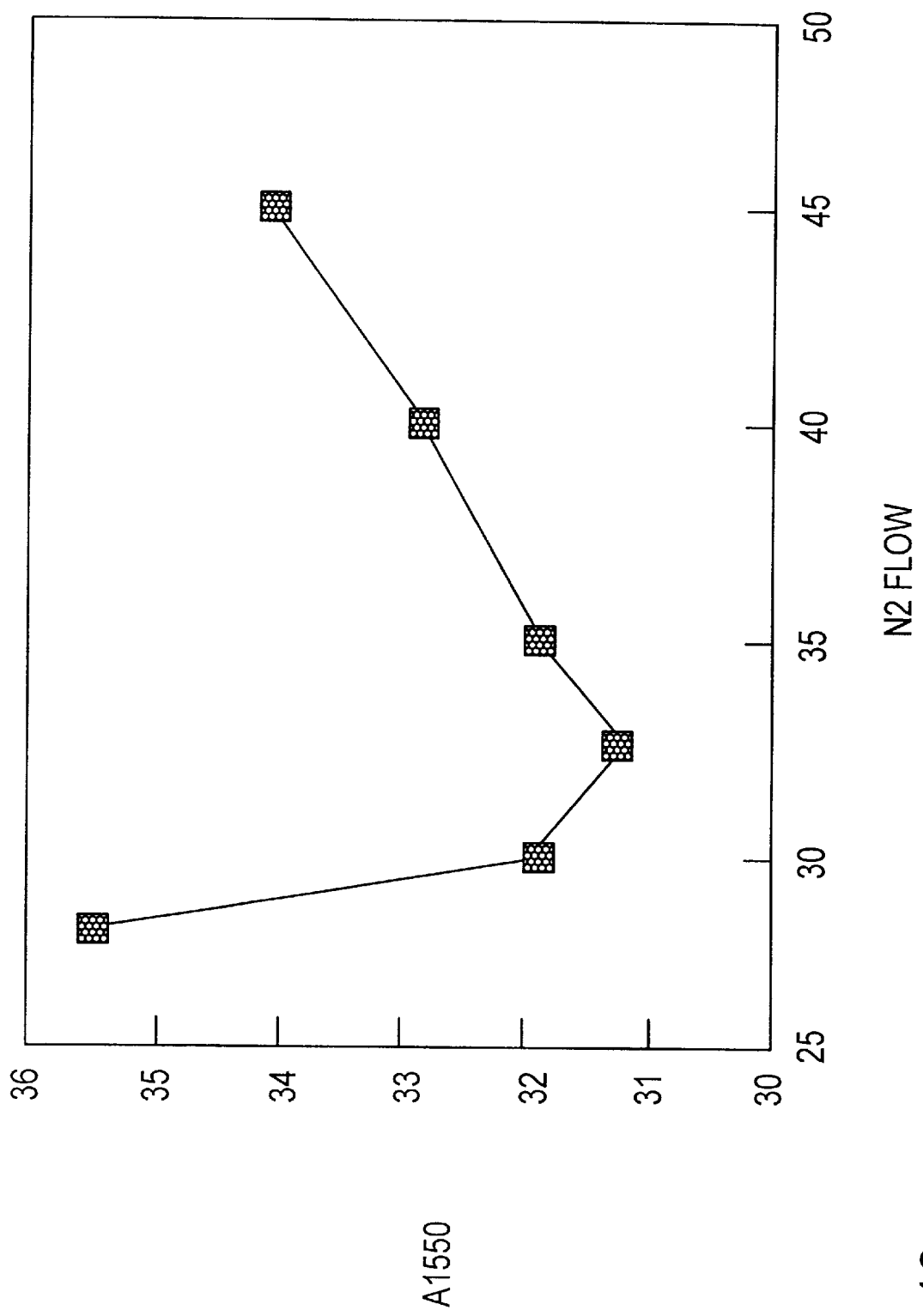
Figure 11:
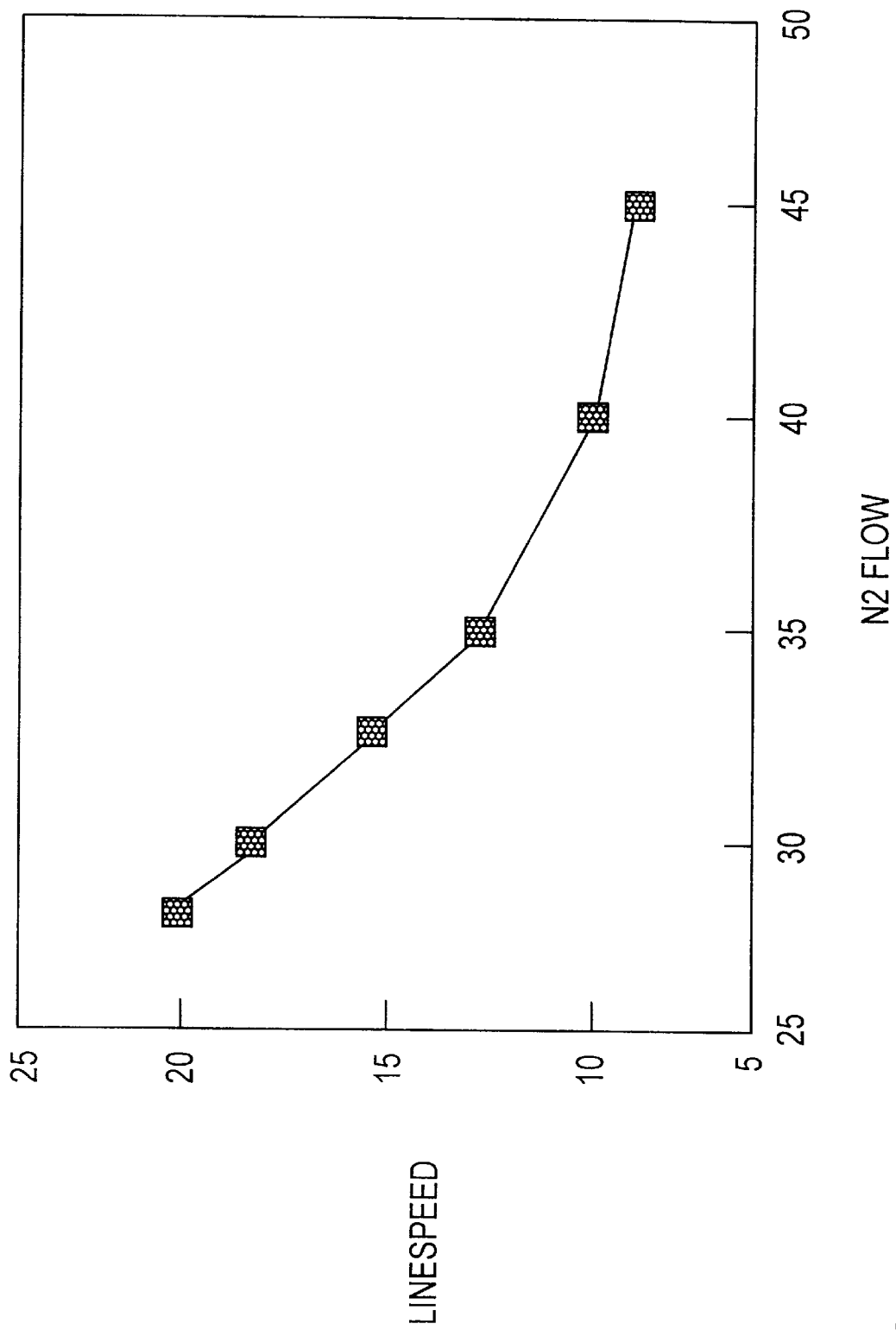

In order to obtain a simple measure of the selectivity at various nitrogen flow rates, two factors were considered, (1) T$_{max}$/T$_{1550}$ and (2) T$_{VIS}$/T$_{1550}$. T$_{max}$ is the maximum transmission at any wavelength in the visible spectrum and T$_{VIS}$ is the weighted visible light transmission. These two factors from Table 1 are shown as being plotted in FIG. 8. Clearly, the preferred coatings were formed with a nitrogen flow rate of 32.5 to 35 sccms. However, acceptable values were achieved with a nitrogen flow rate within the range of 30 to 35 sccms. It is interesting, as shown in the plots of FIGS. 9 and 10, that these preferred flows correspond to the minima and sheet resistance and absorption at 1550 nm (because the transmission was held relatively constant at 1550 nm, a minimum absorption at that wavelength corresponds to a maximum reflection). The "poisoning" effect of nitrogen on the titanium deposition rate is shown in FIG. 11. As the nitrogen flow increased, the linespeed had to be reduced substantially in order to maintain the same value of T$_{1500}$. This is largely due to the decrease in the deposition rate of the titanium nitride as the nitrogen flow rate was increased.

Table 2 shows the details of the measured deposition parameters for forming seven samples of titanium nitride on a PET substrate. In each case, the titanium nitride layers were electrically conductive (i.e., less than 300 ohms per square). Of course, as the films were made thinner in order to achieve higher visible light transmission, the electrical resistance increased. In Table 2, the sheet resistivity was measured in the vacuum chamber immediately after the coating was deposited. These samples (as distinguished by the sample numbers given in Table 2) were used to fabricate various window laminate structures (as given in Tables 4 and 5) for performance comparisons.

TABLE 2

DETAILS OF DEPOSITION PARAMETERS FOR TiN$_x$ SAMPLES

| Measured | Units | 82-2 | 83-1 | 83-2 | 83-3 | 83-4 | 84-1 | 84-2 |
|---|---|---|---|---|---|---|---|---|
| Glow Current | Amps | 100 | 100 | 100 | 100 | 100 | 50 | 50 |
| Glow Voltage | Volts | 1500 | 1500 | 1500 | 1500 | 1500 | 1500 | 1500 |
| Glow O2 Flow | sccm | 13.3 | 13.6 | 14.1 | 14.0 | 13.9 | 11.5 | 11.5 |
| Glow Pressure | microns | 10 | 10 | 10 | 9 | 10 | 7 | 8 |
| Titanium Power | kWatt | 4.5 | 5.7 | 5.7 | 5.7 | 5.7 | 5.7 | 5.7 |
| Titanium Volts | Volts | 460 | 465 | 457 | 454 | 458 | 446 | 446 |
| Titanium Current | Amps | 9.8 | 12.26 | 12.4 | 12.5 | 12.4 | 12.76 | 12.78 |
| Titanium Ar Flow | sccm | 105.5 | 105.5 | 105.5 | 104 | 104 | 105 | 105 |
| Titanium N$_2$ Flow | sccm | 26.2 | 33.5 | 32.5 | 32.5 | 32.5 | 32.5 | 32.5 |
| Titanium Pressure | microns | 3.61 | 3.71 | 3.72 | 3.67 | 3.7 | 3.67 | 3.65 |
| Linespeed | mm/sec | 10.1 | 8.8 | 16.7 | 12.45 | 7.45 | 6.05 | 4.18 |
| Resistance (in situ) | ohm/sq | 185 | 109 | 278 | 194 | 123 | 68 | 43.5 |
| T$_{VIS}$ (in situ) | % | 55 | 47 | 63 | 60 | 47 | 36 | 26 |

Benefits of Using Double TiN$_x$ Layers

In order to determine whether window structures with double titanium nitride layers provided better results than those containing a single titanium nitride layer and/or double nichrome layers, a number of samples were fabricated, with the results being shown in Tables 3–5. The samples listed in Table 3 were dual TiN$_x$ laminates. The laminates listed in Table 4 had a single layer of titanium nitride. The laminates listed in Table 5 included dual layers of a nonselective metal alloy, nichrome. In each table, when a reflection measurement is listed, it is followed by (PET) or (GLASS). This refers to the side on which the laminated window structure reflection measurement was made.

TABLE 3

TiN$_x$ DATA SUMMARY
OPTICAL PROPERTIES FOR WINDOW FILM LAMINATES
CONTAINING TWO (I.E., DUAL) SPUTTERED TiN$_x$ FILMS

| Sample No | 82-2 | 83-1 | 83-2 |
|---|---|---|---|
| Lamination Type | Dual | Dual | Dual |
| T$_{VIS}$: in situ - film only | 55 | 47 | 63 |
| T$_{VIS}$: film only | 59.47 | 51.34 | 67.35 |
| T$_{VIS}$ | 43.55 | 33.49 | 53.98 |
| R$_{VIS}$ (Glass) | 10.64 | 12.29 | 9.93 |
| R$_{VIS}$ (PET) | 10.97 | 12.8 | 10.21 |
| T$_{SOL}$ | 30.85 | 21.55 | 41.7 |
| R$_{SOL}$ (Glass) | 12.14 | 15.67 | 10.01 |
| R$_{SOL}$ (PET) | 13.74 | 18.76 | 11.1 |
| Ta* | −3.32 | −3.98 | −2.73 |
| Tb* | 1.55 | 0.23 | 3.92 |
| Ra* (Glass) | 1.2 | 2.13 | 0.15 |
| Rb* (Glass) | −0.35 | 1.9 | −2.05 |
| Ra* (PET) | 1.64 | 2.88 | 0.6 |
| Rb* (PET) | −0.23 | 2.47 | −1.9 |
| Sol Rej (Glass) | 53.8 | 61.5 | 45.3 |

TABLE 4

TiN$_x$ DATA SUMMARY
OPTICAL PROPERTIES FOR WINDOW FILM LAMINATES
CONTAINING A SINGLE SPUTTERED TiN$_x$ COATED FILM

| Sample No. | 83-3 | 83-4 | 84-1 | 84-2 |
|---|---|---|---|---|
| Lamination Type | Single | Single | Single | Single |
| T$_{VIS}$: in situ - film only | 67 | 47 | 36 | 26 |
| T$_{VIS}$: film only | 61.25 | 51.1 | 39.51 | 28.82 |
| T$_{VIS}$ | 62.74 | 54.9 | 42.88 | 33.41 |
| R$_{VIS}$ (Glass) | 10.04 | 10.8 | 14.81 | 19.38 |
| R$_{VIS}$ (PET) | 12.15 | 13.4 | 18.26 | 22.86 |
| T$_{SOL}$ | 50.41 | 41.42 | 29.79 | 21.79 |
| R$_{SOL}$ (Glass) | 10.7 | 13.5 | 20.28 | 26.54 |
| R$_{SOL}$ (PET) | 14.47 | 18.55 | 27.45 | 34.78 |
| Ta* | −2.32 | −2.8 | −3.2 | −3.43 |
| Tb* | 1.75 | 0.81 | −2.34 | −4.62 |
| Ra* (Glass) | 0.54 | 1.55 | 2.52 | 2.98 |
| Rb* (Glass) | −1.04 | 0.94 | 6.78 | 11.05 |
| Ra* (PET) | 1.04 | 2.23 | 3.16 | 3.71 |
| Rb* (PET) | −1.7 | −0.46 | 5.58 | 9.27 |
| Sol Rej (Glass) | 39.1 | 46.4 | 56.7 | 64.3 |

TABLE 5

NiCr DATA SUMMARY
OPTICAL PARAMETERS FOR WINDOW FILM LAMINATES
CONTAINING TWO (I.E., DUAL) SPUTTERED NiCr FILMS

| Sample No. | R1-Q1 | R1-Q2 | R1-Q3 |
|---|---|---|---|
| Lamination Type | Dual | Dual | Dual |
| T$_{VIS}$: film only | 40.06 | 52.39 | 65.43 |
| T$_{VIS}$ | 22.03 | 35.2 | 51.49 |
| R$_{VIS}$ (Glass) | 14.61 | 11.39 | 9.84 |
| R$_{VIS}$ (PET) | 15.35 | 11.51 | 9.8 |
| T$_{SOL}$ | 18.18 | 30.25 | 46.75 |
| R$_{SOL}$ (Glass) | 13.98 | 10.59 | 8.87 |
| R$_{SOL}$ (PET) | 15.96 | 12.02 | 9.54 |
| Ta* | −0.95 | −1.14 | −1.12 |
| Tb* | −2.99 | −0.97 | 1.4 |
| Ra* (Glass) | −0.85 | −0.48 | −0.56 |
| Rb* (Glass) | 1.36 | −0.18 | −1.14 |
| Ra* (PET) | −0.084 | −0.015 | −0.17 |
| Rb* (PET) | 1.9 | 0.43 | −0.42 |
| Sol Rej (Glass) | 63.5 | 53.8 | 41.3 |

Within the single sputtered films of titanium nitride of Table 4, thicker titanium nitride layers were required in order to obtain lower transmissions. After lamination to glass, the resulting composites had visible transmissions ranging from approximately 33% to approximately 63%. The dual titanium nitride layers provided a visible transmission range of 33% to 54%. Regarding visible reflection from the glass side of applied window film laminates containing various single and double titanium nitride films, at lower transmissions (e.g., approximately 55%), significantly lower reflections are obtained if two separate sputtered titanium nitride layers are used instead of one thicker titanium nitride layer. The same trend applies with regard to reflection from the PET side.

One concern with using dual layers is that for a given visible transmission, the solar rejection might be significantly lower than that observed for coatings containing a single sputtered layer. Measurements of solar rejection are obtained using the following equation for monolithic glazing:

solar rejection=solar reflection+(0.73×solar absorption)

where solar absorption=100%−solar reflection−solar transmission.

Here, integrated solar properties are determined using wavelength specific weighting factors as specified in ASTM E 891. From Tables 3–5 and FIG. 12, it can be seen that the solar rejection for single titanium nitride layers is only two or three percentage points greater than the double layers. This is a relatively small sacrifice in order to receive the benefit of the large decrease in visible reflection.

Figure 12:
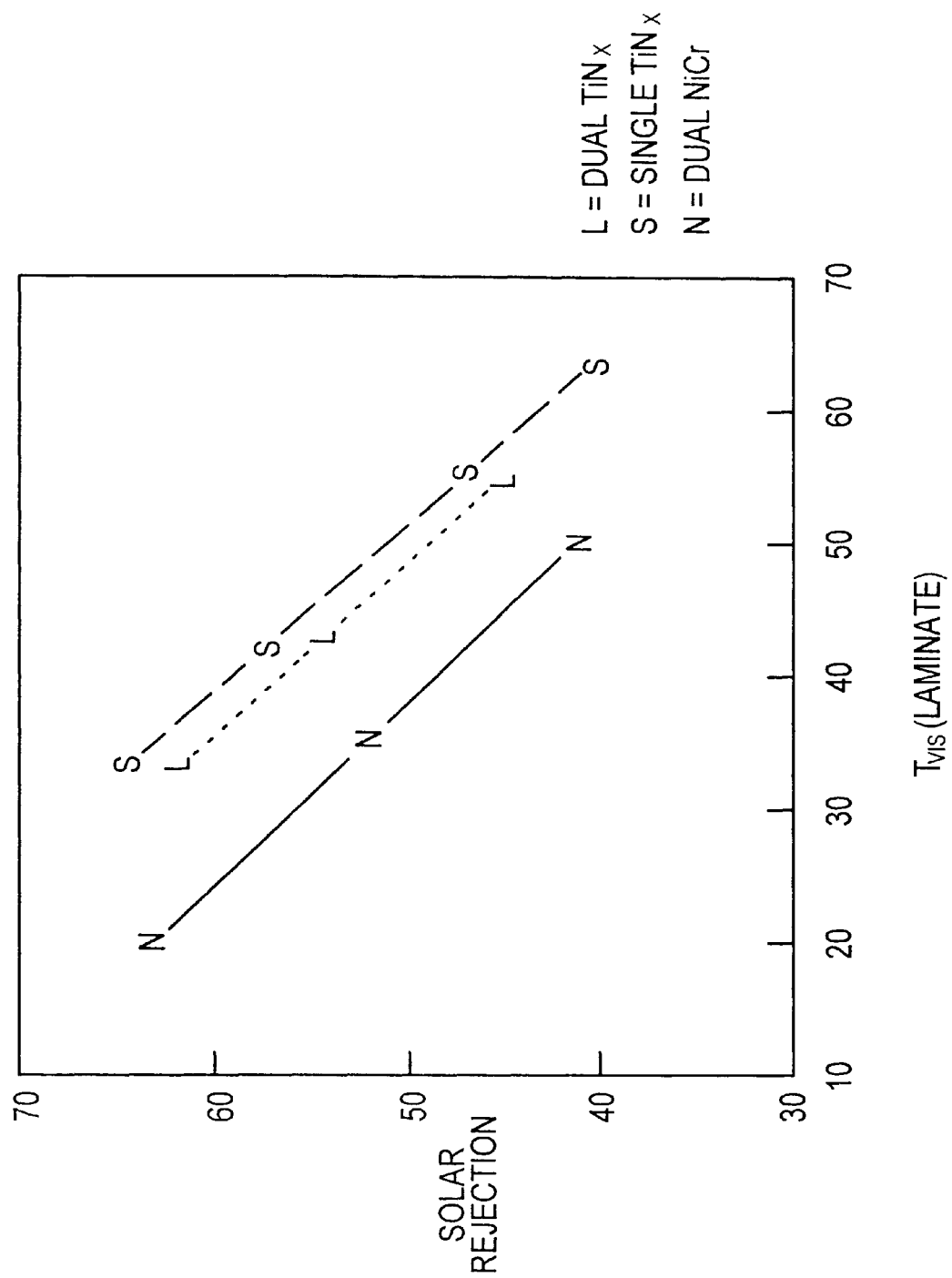
FIG. 12 is a comparison of performances of three laminates having single and double layer titanium nitride film and a double layer nichrome film.

FIG. 12 also illustrates the benefits of the present invention over the prior art of dual nonselective metals. Clearly, for a given visible transmission the dual TiN$_x$ window construct provides significantly higher solar rejection than the dual nichrome constructs.

In Tables 3–5, transmitted and reflected a* b* colors (from both sides of the glass/film composite) are indicated. It is noted that +a* means red, −a* means green, while +b* means yellow and −b* means blue. The primary difference between the two structures is in Rb*. The single film structures become more yellowish (gold or brass-like) at lower transmissions when viewed from either side of the composite. The dual film structures remain more color neutral.

What is claimed is:

1. A method of fabricating a solar control member comprising steps of:
    sputtering a first titanium nitride layer on a first transparent substrate such that said first titanium nitride layer maintains a transmission of at least thirty percent with respect to visible light;
    sputtering a second titanium nitride layer on a second transparent substrate such that said second titanium nitride layer maintains a transmissivity of at least thirty percent with respect to visible light; and
    bonding said first titanium nitride layer to said second titanium nitride layer, including spacing said first titanium nitride layer from said second titanium nitride layer by a distance that is sufficient to promote optical decoupling therebetween.

2. The method of claim 1 wherein said steps of sputtering include maintaining a sputtering environment in which a ratio of oxygen to nitrogen partial pressures is less than 0.5.

3. The method of claim 1 wherein said steps of sputtering include forming said first and second titanium nitride layers to contain less than 20 atomic percent of oxygen.

4. The method of claim 3 wherein said steps of sputtering include forming said first and second titanium nitride layers to contain less than 10 atomic percent of oxygen.

5. The method of claim 1 wherein said steps of sputtering include using a mask on which a portion of titanium nitride plasma collects.

6. The method of claim 1 wherein said bonding step includes applying a laminating adhesive between said first and second titanium nitride layers, said laminating adhesive having a thickness of at least 700 nm, thereby promoting said optical decoupling with respect to constructive and destructive interference of visible light propagating therebetween.

7. The method of claim 6 wherein said bonding step includes applying said laminating adhesive to a thickness of at least 3000 nm, said laminating adhesive being in contact with both of said first and second titanium nitride layers.

8. The method of claim 1 further comprising a step of forming at least one layer of a transparent oxide or a transparent nitride between said first titanium nitride layer and said first transparent substrate, said at least one layer having a refractive index that is at least as great as a refractive index of said first transparent substrate.

9. The method of claim 8 wherein said step of forming said at least one layer includes forming a silicon nitride layer having a thickness in the range of 10 nm to 60 nm.

10. The method of claim 1 further comprising forming a hardcoat layer and a lubricating layer on an exterior surface.

11. A method of fabricating a solar control member comprising steps of:

provided a substantially transparent substrate;

forming a first titanium nitride layer at a fixed position relative to a first surface of said transparent substrate; and forming a second titanium nitride layer at a fixed position from said first titanium nitride layer, said first and second titanium nitride layers being on a same side of said transparent substrate and being spaced apart by a distance of at least 700 nm to provide optical decoupling with respect to constructive and destructive interference of visible light propagating between said first and second titanium nitride layers, wherein said first and second titanium nitride layers cooperate to provide a higher transmission of visible light than infrared light.

12. The method of claim 11 further comprising a step of forming an optically massive layer which contacts each of said first and second titanium nitride layers, said optically massive layer having a thickness of at least 1000 nm, thereby providing said optical decoupling.

13. The method of claim 12 wherein said step of forming said optically massive layer includes providing a laminating adhesive.

14. The method of claim 11 wherein said steps of forming said first and second titanium nitride layers include using sputter deposition techniques.

15. The method of claim 14 wherein said steps that include using sputter deposition techniques employ sputtering through a mask.

16. The method of claim 11 further comprising steps of forming a hardcoat layer and a lubricating layer to provide protection to an exterior surface.

17. The method of claim 11 further comprising a step of forming a layer of silicon nitride between said transparent substrate and said first titanium nitride layer, said silicon nitride having a thickness in the range of 10 nm to 60 nm.

18. The method of claim 11 further comprising a step of forming a thin layer of transparent oxide or transparent nitride on a side of said second titanium nitride layer opposite to said first titanium nitride layer, said thin layer having a thickness in the range of 10 nm to 60 nm.

* * * * *